(12) United States Patent
Peng

(10) Patent No.: US 11,511,677 B2
(45) Date of Patent: Nov. 29, 2022

(54) ROTATION-FACILITATING VEHICLE-MOUNTED BICYCLE CARRIER

(71) Applicant: ZhongShan ZhaoSheng Metal Products Co., Ltd, ZhongShan (CN)

(72) Inventor: Cheng Peng, ZhongShan (CN)

( * ) Notice: Subject to any disclaimer, the term of this patent is extended or adjusted under 35 U.S.C. 154(b) by 0 days.

(21) Appl. No.: 17/580,675

(22) Filed: Jan. 21, 2022

(65) Prior Publication Data

US 2022/0144183 A1    May 12, 2022

(51) Int. Cl.
*B60R 9/10* (2006.01)

(52) U.S. Cl.
CPC ..................... *B60R 9/10* (2013.01)

(58) Field of Classification Search
CPC ........................................................ B60R 9/10
See application file for complete search history.

(56) References Cited

U.S. PATENT DOCUMENTS

| | | | | |
|---|---|---|---|---|
| 7,240,816 | B2 * | 7/2007 | Tsai | B60R 9/10 211/195 |
| 8,141,760 | B2 * | 3/2012 | Kuschmeader | B60R 9/06 280/506 |
| 10,183,627 | B1 * | 1/2019 | Liu | B60R 9/06 |
| 10,906,473 | B1 * | 2/2021 | Yu | B60R 9/06 |
| 11,091,099 | B1 * | 8/2021 | Shen | B60R 9/06 |
| 2001/0040139 | A1 | 11/2001 | Dean et al. | |
| 2008/0164292 | A1 | 7/2008 | Farney | |
| 2010/0320247 | A1 * | 12/2010 | Wang | B60R 9/10 224/567 |
| 2011/0139839 | A1 | 6/2011 | Foley | |
| 2018/0134229 | A1 * | 5/2018 | Shen | B60R 9/06 |

FOREIGN PATENT DOCUMENTS

EP            645284 A1 *  3/1995  ............... B60R 9/06

* cited by examiner

*Primary Examiner* — Scott T McNurlen
(74) *Attorney, Agent, or Firm* — Rumit R. Kanakia

(57) ABSTRACT

The present disclosure relates to the technical field of vehicle-mounted bicycle carrier, specifically to a rotation-facilitating vehicle-mounted bicycle carrier, which includes a fixed rod; one end of the fixed rod is provided with two connecting tabs; one end of a rotating rod is rotatably provided between the two connecting tabs through a screw rod; a connecting slot is fixed at the other end of the rotating rod; the connecting slot includes two support plates; a cross rod is fixed at two horizontal ends of the connecting slot in a penetrating manner. The bicycle carrier can be adjusted, according to an actual situation, to be in a state of being placed in a plurality of angles, and the fixing stability is improved by means of threaded connection and plug pin fixing. The bicycle carrier is applicable to various vehicles.

5 Claims, 3 Drawing Sheets

ROTATION-FACILITATING VEHICLE-MOUNTED BICYCLE CARRIER

TECHNICAL FIELD

The present disclosure relates to the technical field of vehicle-mounted bicycle carriers, specifically to a rotation-facilitating vehicle-mounted bicycle carrier.

BACKGROUND

Vehicle-mounted bicycle carriers are very common nowadays. People use this carrier to implement that a bicycle can be easily carried on an automobile. However, there are generally two installation forms for the vehicle-mounted bicycle carriers on the market: one is that the carrier is fixed on the roof, and the other one is that the carrier is fixed at the rear end. For the first kind of bicycle carrier installed on the top of an automobile, during use, the entire carrier is fixed on the top of the automobile, and the height of the automobile is increased. When not used, the entire carrier is removed, which is cumbersome to install and remove. For the second kind of bicycle carrier installed on the rear end of the automobile, the position on the carrier for fixing a bicycle is usually unchangeable, and the bicycle can only be transversely placed. After the bicycle is transversely fixed at the tail of a small-sized automobile, it will increase the length of the automobile and is not convenient. Therefore, the above problems need to be improved urgently.

SUMMARY

Technical Problems to be Solved

For the above-mentioned defects in the prior art, the present disclosure provides a rotation-facilitating vehicle-mounted bicycle carrier. The bicycle carrier can be adjusted, according to an actual situation, to be in a state of being placed in a plurality of angles and is applicable to various vehicles.

Technical Solution

In order to achieve the above objective, the present disclosure is implemented through the following technical solution:

The present disclosure provides a rotation-facilitating vehicle-mounted bicycle carrier, which includes a fixed rod; one end of the fixed rod is provided with two connecting tabs; one end of a rotating rod is rotatably provided between the two connecting tabs through a screw rod; a connecting slot is fixed at the other end of the rotating rod; the connecting slot includes two support plates; a cross rod is fixed at two horizontal ends of the connecting slot in a penetrating manner; the cross rod is fixed at the bottom of the connecting slot through a plurality of first screws penetrating through the two support plates and the cross rod; the inside of the upper part of the connecting slot is rotatably connected with a vertical rod through a second screw; furthermore, the vertical rod may be fixed by a plug pin; two ends of the cross rod are respectively connected with two wheel seats; and the upper part of the vertical rod is provided with two fixed hooks.

The wheel seats are respectively arranged on two sides of the cross rod; one pair of wheel seats arranged on the same side of the cross rod is one group; first sleeving seats for sleeving the cross rod are arranged on the wheel seats; and spiral twisting bolts for fastening are arranged on the first sleeving seats.

Further, the fixed hooks are respectively arranged on two sides of the vertical rod; orientations of the fixed hooks correspond to one group of wheel seats; second sleeving seats for sleeving the vertical rod are arranged on the fixed hooks; and spiral twisting bolts for fastening are arranged on the second sleeving seats.

Further, the support plate is half-moon-shaped.

Further, the plug pin is connected to the connecting slot through a wire.

Beneficial Effects

Compared with the existing public technology, the technical solution provided by the present disclosure has the following beneficial effects: the present disclosure relates to the rotation-facilitating vehicle-mounted bicycle carrier which is easy to operate and convenient to mount, so that frequent removal and storage are avoided, and it is not necessary to occupy a too large space. Furthermore, the bicycle carrier can be adjusted, according to the actual situation, to be in the state of being placed in a plurality of angles. The fixing stability is improved by means of threaded connection and plug pin fixing. The bicycle carrier is applicable to various vehicles.

BRIEF DESCRIPTION OF THE DRAWINGS

In order to describe the technical solutions in the embodiments of the present disclosure or in the prior art more clearly, drawings used in the description of the embodiments or the prior art are briefly described below. Apparently, the drawings in the following description are only some embodiments of the present disclosure. Those of ordinary skill in the art can further obtain other drawings based on these drawings without creative work.

DETAILED DESCRIPTION OF THE EMBODIMENTS

In order to make the objectives, technical solutions and advantages of the embodiments of the present disclosure clearer, the technical solutions in the embodiments of the present disclosure are described clearly and completely below in conjunction with the drawings in the embodiments of the present disclosure. Obviously, the described embodiments are a part of the embodiments of the present disclosure, not all the embodiments. Based on the embodiments in the present disclosure, all other embodiments obtained by those of ordinary skill in the art without creative work shall fall within the protection scope of the present disclosure.

Figure 1:
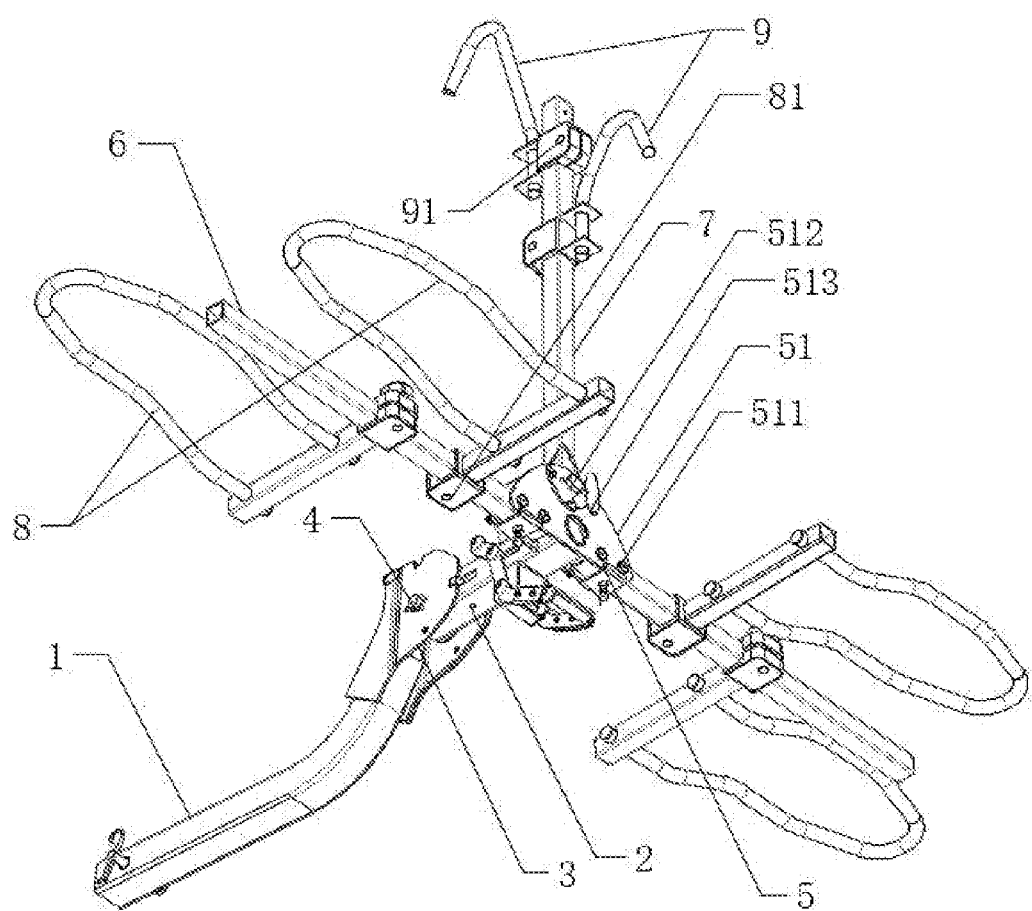
FIG. 1 is a three-dimensional schematic diagram of a rotation-facilitating vehicle-mounted bicycle carrier provided in one embodiment of the present disclosure.
Figure 2:
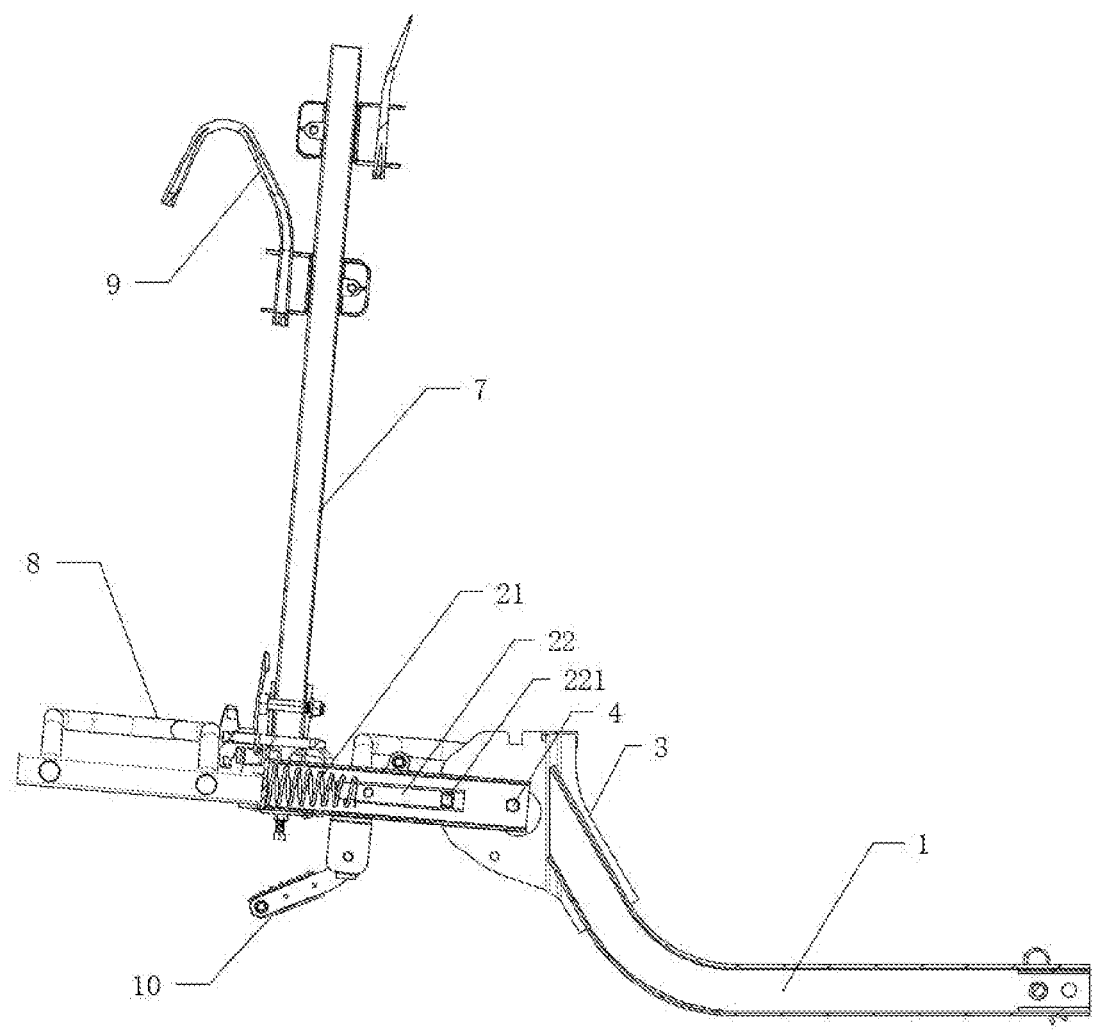
FIG. 2 is a sectional side view of a rotation-facilitating vehicle-mounted bicycle carrier provided in one embodiment of the present disclosure.

Referring to FIG. 1 and FIG. 2, one embodiment of the present disclosure provides a rotation-facilitating vehicle-mounted bicycle carrier, including a fixed rod (1), wherein one end of the fixed rod (1) is provided with two connecting tabs (3); one end of a rotating rod (2) is rotatably provided between the two connecting tabs (3) through a screw rod (4); a connecting slot (5) is fixed at the other end of the rotating rod (2); the connecting slot (5) comprises two support plates (51); a cross rod (6) is fixed at two horizontal ends of the connecting slot (5) in a penetrating manner; the cross rod (6) is fixed at the bottom of the connecting slot (5) through a plurality of first screws (511) penetrating through the two support plates (51) and the cross rod (6); the inside of the upper part of the connecting slot (5) is rotatably connected with a vertical rod (7) through a second screw (512); furthermore, the vertical rod (7) may be fixed by a plug pin (513); two ends of the cross rod (6) are respectively connected with two wheel seats (8); and the upper part of the vertical rod (7) is provided with two fixed hooks (9).

Figure 3:
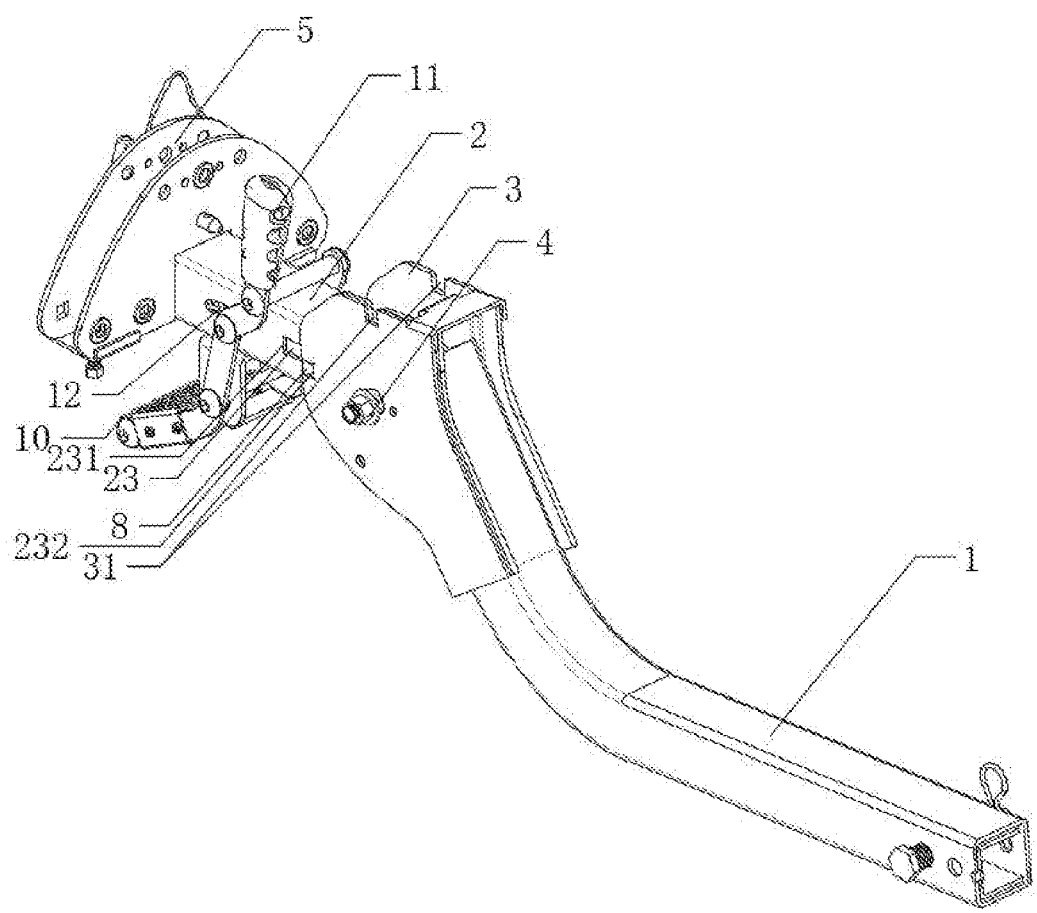
FIG. 3 is a three-dimensional schematic diagram of a rotating rod portion in rotation-facilitating vehicle-mounted bicycle carrier provided in one embodiment of the present disclosure.
Figure 4:
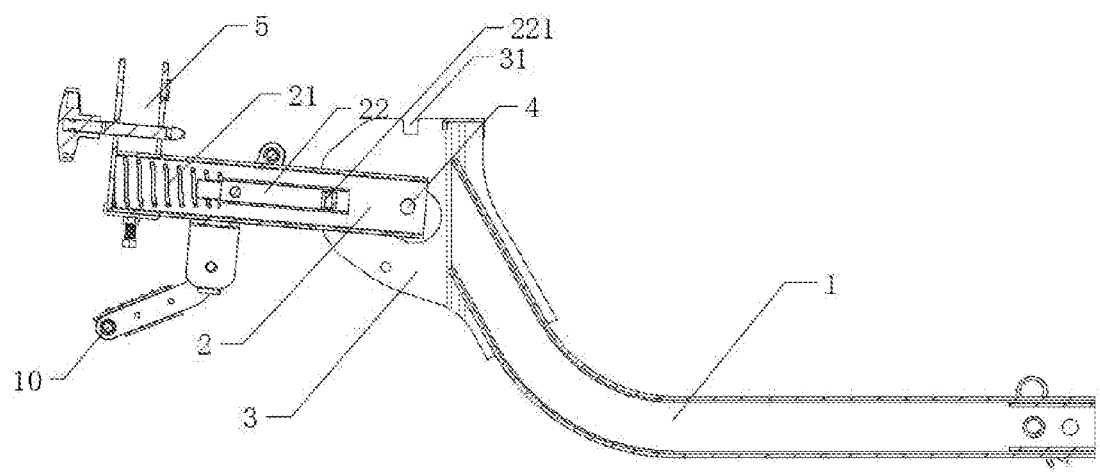
FIG. 4 is a schematic sectional diagram of a rotating rod portion in rotation-facilitating vehicle-mounted bicycle carrier provided in one embodiment of the present disclosure.

During specific implementation, one end of the rotating rod (2) is provided with a through hole; through holes are also formed in corresponding positions of the two connecting tabs (3); and the screw rod (4) passes through the through hole in the rotating rod (2) and the through holes in the corresponding positions of the two connecting tabs (3), so that the rotating rod (2) is connected to the two connecting tabs (3) and can rotate around the screw rod (4). The connecting slot (5) is fixed at the other end of the rotating rod (2); the cross rod (6) is fixed at the two horizontal ends of the connecting slot (5) in the penetrating manner; the inside of the upper part of the connecting slot (5) is rotatably connected with the vertical rod (7); the two ends of the cross rod (6) are respectively connected with two wheel seats (8); and the upper part of the vertical rod (7) is provided with the two fixed hooks (9). The two wheel seats (8) are respectively used for placing front and rear wheels of a bicycle. The two fixed hooks (9) are used for positioning the bicycle from top to bottom. The fixed rod (1) is used for fixing the carrier on an automobile. As shown in FIG. 3 and FIG. 4, an elastic member (21) and a sliding member (22) connected to the elastic member (21) are arranged inside the rotating rod (2); a first sliding chute (23) is arranged on a side wall of the rotating rod (2); and a protruding structure (221) of the sliding member (22) is located in the first sliding chute (23) and protrudes from the side wall of the rotating rod (2). Two ends of the first sliding chute (23) are respectively a first end point (231) and a second end point (232). When the protruding structure (221) is located at the position of the first end point (231) of the first sliding chute (23), the elastic member (21) is in a compressed state, so that the protruding structure (221) is clung and fixed to the position of the first end point (231). Therefore, to make the protruding structure (221) to move from the position of the first end point (231) to the position of the second end point (232) along the first sliding chute (23), the elastic member (21) needs to be continued to be compressed. As shown in FIG. 1, when the protruding structure (221) is located at the position of the first end point (231), the protruding structure (221) can be snapped into fixing slots (31) on the connecting tabs (3). At this time, the rotating rod (2) cannot rotate. To rotate the rotating rod (2), a spring is required to be compressed, so that the protruding structure (221) leaves the position of the first end point (221), thereby achieving rotation and fixing of the rotating rod (2).

In this embodiment, for the convenience of compressing the elastic member (6), a pedal (10) and a handle (11) are generally provided. The pedal (10) and the handle (11) pass through a second sliding chute (12) in a side wall of the vertical rod (2) and are connected to the sliding member (7) inside the vertical rod (2) to push the sliding member (7) to compress the elastic member (6).

In this embodiment, the elastic member (22) generally adopts a conical spring.

In this embodiment, the fixed rod (1) is used for being fixedly arranged on the rear part of the automobile. For the convenience of fixing, the fixed rod (1) is generally L-shaped.

In this embodiment, as shown in FIG. 3 and FIG. 4, the connecting tab (3) is provided with a plurality of fixing slots (31); the fixing slots (31) on the two connecting tabs (3) correspond to each other two by two; there are also two first sliding chutes (23) and two protruding structures (221) which are respectively located on two opposite side walls of the rotating rod (2), so as to improve the stability of fixing of the protruding structures (221) entering the fixing slots (31); and the multiple pairs of fixing slots (31) enhance the multi-angle fixing of the rotating rod (2), thereby achieving multi-angle placement of the bicycle.

In this embodiment, to place multiple bicycles, referring to FIG. 1, the wheel seats (8) are respectively arranged on two sides of the cross rod (6); and one pair of wheel seats (8) arranged on the same side of the cross rod (6) is one group. In addition, in order to improve the tightness, the first sleeving seats (81) for sleeving the cross rod (6) are arranged on the wheel seats (8); and spiral twisting bolts for fastening are arranged on the first sleeving seats (81). Further, the fixed hooks (9) are respectively arranged on two sides of the vertical rod (7); orientations of the fixed hooks (9) correspond to one group of wheel seats (8); second sleeving seats (91) for sleeving the vertical rod (7) are arranged on the fixed hooks (9); and spiral twisting bolts for fastening are arranged on the second sleeving seats (91). Much further, the support plate (51) is semicircular in this embodiment, which is not actually limited to this. For example, it may also be inversely T-shaped.

In this embodiment, in order to prevent the plug pin (513) from being lost, the plug pin (513) can be connected to the connecting slot (5) through a wire.

The present disclosure has the advantages that the rotation-facilitating vehicle-mounted bicycle carrier is easy to operate and convenient to mount, so that frequent removal and storage are avoided, and it is not necessary to occupy a too large space. Furthermore, the bicycle carrier can be adjusted, according to the actual situation, to be in the state of being placed in a plurality of angles. The bicycle carrier is applicable to various vehicles.

The above embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some of the technical features, and these modifications or replacements do not depart the essences of the corresponding technical solutions from the protection scope of the technical solutions of all the embodiments of the present disclosure.

What is claimed is:
1. A rotation-facilitating vehicle-mounted bicycle carrier, comprising a fixed rod (1), wherein one end of the fixed rod (1) is provided with two connecting tabs (3); one end of a rotating rod (2) is rotatably provided between the two connecting tabs (3) through a screw rod (4); a connecting slot (5) is fixed at the other end of the rotating rod (2); the connecting slot (5) comprises two support plates (51); a cross rod (6) is fixed at two horizontal ends of the connecting slot (5) in a penetrating manner; the cross rod (6) is fixed at the bottom of the connecting slot (5) through a plurality of first screws (511) penetrating through the two support plates (51) and the cross rod (6); the inside of the upper part of the connecting slot (5) is rotatably connected with a vertical rod (7) through a second screw (512); furthermore, the vertical rod (7) may be fixed by a plug pin (513); two ends of the cross rod (6) are respectively connected with two wheel seats (8); and the upper part of the vertical rod (7) is provided with two fixed hooks (9), an elastic member (21) and a sliding member (22) connected to the elastic member (21) are arranged inside the rotating rod (2); a first sliding chute (23) is arranged on a side wall of the rotating rod (2); and a protruding structure (221) of the sliding member (22) is located in the first sliding chute (23) and protrudes from the side wall of the rotating rod (2), a pedal (10) and a handle (11) pass through a second sliding chute (12) in a side wall of the rotating rod (2) to be connected to the sliding member (22) inside the rotating rod (2) and are configured to push the sliding member (22) to compress the elastic member (21) to push the protruding structure (221) to move along the first sliding chute (23) so as to rotate and fix the rotating rod (2) relative to the fixed rod (1).

2. The rotation-facilitating vehicle-mounted bicycle carrier according to claim 1, wherein the wheel seats (8) are respectively arranged on two sides of the cross rod (6); one pair of wheel seats (8) arranged on the same side of the cross rod (6) is one group; first sleeving seats (81) for sleeving the cross rod (6) are arranged on the wheel seats (8); and spiral twisting bolts for fastening are arranged on the first sleeving seats (81).

3. The rotation-facilitating vehicle-mounted bicycle carrier according to claim 2, wherein the fixed hooks (9) are respectively arranged on two sides of the vertical rod (7); orientations of the fixed hooks (9) correspond to one group of wheel seats (8); second sleeving seats (91) for sleeving the vertical rod (7) are arranged on the fixed hooks (9); and spiral twisting bolts for fastening are arranged on the second sleeving seats (91).

4. The rotation-facilitating vehicle-mounted bicycle carrier according to claim 2, wherein the support plate (51) is half-moon-shaped.

5. The rotation-facilitating vehicle-mounted bicycle carrier according to claim 1, wherein the plug pin (513) is connected to the connecting slot (5) through a wire.

* * * * *